United States Patent [19]

Aboaf et al.

[11] 4,396,575
[45] Aug. 2, 1983

[54] ZERO MAGNETOSTRICTION FE-CO-CR MAGNETIC RECORDING MEDIA

[75] Inventors: Joseph A. Aboaf, Peekskill, N.Y.; Erik Klokholm, Stamford, Conn.

[73] Assignee: International Business Machines Corporation, Armonk, N.Y.

[21] Appl. No.: 221,867

[22] Filed: Dec. 31, 1980

[51] Int. Cl.³ ............................................. C22C 19/05
[52] U.S. Cl. .................................. 420/440; 428/606; 365/171; 148/31.55
[58] Field of Search ............ 75/171; 148/31.57, 31.55; 428/611, 606, 928, 678, 679; 365/171; 420/440

[56] References Cited

U.S. PATENT DOCUMENTS

| | | | |
|---|---|---|---|
| 2,244,517 | 6/1941 | de Golyer et al. | 75/171 |
| 3,614,893 | 10/1967 | Nesbitt et al. | 75/123 K |
| 4,034,588 | 7/1977 | Way et al. | 75/171 |
| 4,054,723 | 10/1977 | Higginbothan et al. | 75/171 |
| 4,245,008 | 1/1981 | Michaelson et al. | 428/611 |

OTHER PUBLICATIONS

Klokholm et al, "Sputtering FeCoCr Thin Film Magnetic Media", IBM Technical Disclosure Bulletin, vol. 21, No. 10, Mar. 1979, p. 4241.

Primary Examiner—John P. Sheehan
Attorney, Agent, or Firm—Graham S. Jones

[57] ABSTRACT

A low or zero magnetostriction ferromagnetic alloy is used for a magnetic recording medium. The alloy is $(Fe_yCo_{1-y})_{1-x}Cr_x$ where y (Fe) is preferably 15–23 atomic percent of the FeCo part of the alloy. The value of x (Cr) is 7–20 atomic percent of the alloy and the remainder 1-x (FeCo) is 83–92 atomic percent of the alloy. The maximum ranges of the composition of the alloy are about as follows:

Fe - 8–24 atomic percent
Co - 56–83 atomic percent
Cr - 7–20 atomic percent

The material is adapted for use at room temperature below the Curie temperature of the specific alloy employed. When y (Fe) is 13 at. % and x (Cr) is 7 at. % the magnetostriction remains at zero, but the material is not corrosion resistant and thus it is useful for magnetic recording applications only where corrosion is not a problem. Thus the percentage of Cr must be within the range from 7–17 atomic percent. Above about 17 atomic percent of Cr, the saturation magnetization of the films falls off rather precipitously and it reaches zero at about 20 atomic percent of Cr. This has been shown for $Fe_{48}Co_{52}$ in combination with percentages of Cr added to that FeCo mixture. These alloys are useful for magnetic recording media because of their low magnetostriction which increases the capacity to have assurance as to the location of a bit of information on a medium.

5 Claims, 4 Drawing Figures

ZERO MAGNETOSTRICTION FE-CO-CR MAGNETIC RECORDING MEDIA

DESCRIPTION

1. Technical Field

This invention relates to magnetic recording media coatings and more particularly to a thin film magnetic recording layer on which data is stored in the form of discrete areas of magnetization encoded by magnetic polarity, the magnetization of which can be controlled and sensed by magnetic recording transducers such as magnetic recording heads. The magnetic recording media can be carried on a substrate material such as a tape, disk, drum and other substrate which can support a thin film of a magnetic recording material.

2. Background Art

In storage of information in magnetic recording media, reliability of storage of data is of paramount importance. The trend in modern data processing is towards ever smaller units of the data processing system. In the case of magnetic recording media, this means that the magnetic information is stored in a smaller area of the medium than before. The problem that arises is that it becomes more critical that the medium and the magnetic recording head reading the medium be capable of being used accurately. The head must be moved to exactly the correct position where the information is supposed to be stored on the medium. If the medium remains mechanically stable then the servo control system and the drive which move the magnetic recording head into position to read the magnetic recording medium can position itself based upon the known location of the data on the substrate. However, currently utilized magnetic recording media are magnetostrictive which means that as information is stored in the medium, the magnetostrictive forces generated can destroy or alter the stored information. Accordingly, we have found that it is highly desirable for the magnetic recording medium to be composed of materials which have as little magnetostriction as possible. Preferably, the magnetic recording medium should have zero magnetostriction.

In United States patent application Ser. No. 956,296, now U.S. Pat. No. 4,245,008 issued Jan. 13, 1981 of Michalesen et al "Corrosion Resistant Magnetic Recording Media" teaches the use of Fe-Co-Cr compositions for magnetic recording media. However, we have found that the amount of Fe in the composition taught by Michaelsen et al produces a substantial value of magnetostriction since the amount of Fe varies on the phase diagram in FIG. 2 from 45 at. % up to 100% atomic percent and more importantly, the maximum amount of Co is 55% atomic percent which ranges down to 0% of cobalt. In accordance with this invention on the other hand, the minimum quantity of Co is greater than that of Michaelsen's upper limit of 55%. In either case, the amount of chromium in the material is about the same. The Cr is present to provide corrosion resistance. It should be emphasized at this point that the objective of the Michaelsen et al patent was to provide a new magnetic recording media which is corrosion resistant. No mention is made there of the problem caused by magnetostriction, because Michaelsen et al were emphasizing the earlier critical problem of corrosion of magnetic recording media which is even more serious than the problem of magnetostriction. At one point in FIG. 3A Ref. #1.3 lists a composition of Fe 19 at. %, Co 67 at. % and Cr 14 at. % among many other materials "deposited by sputtering process." Nothing in the reference suggests that there is a possible advantage to the use of such a composition. It is merely mentioned in a large amount of data which is related to materials which are not useful.

In summary Michaelsen et al Ser. No. 956,296 describes use of a magnetic medium of 0-55 at. % Co, 8-22 at. % Cr, with the remainder Fe (23-77 at. %). The percentage of Cr in the alloy is about the same but the percentages of Fe and Co are quite different with the optimum value of Fe percentage about 13 at. % for this and the low end of the reference 23 at. % Fe which is greater than the highest permissible value of Fe of 21 at. % in this disclosure. The alloys are essentially nearest neighbors in that the only change is that the FeCo ratio has been reduced. However, in FIG. 3A, reference 1.3, the composition was Fe 19 atomic percent, Co 67 atomic percent, and Cr 14 atomic percent which provided $H_c$ of 110, 110 Oe; $M_2$ 1050 emu/g; $M_r$ 670 emu/g and S. 63 and corrosion of 40.

U.S. Pat. No. 3,614,893 of Nesbitt et al for a "Splat Cooled Fe-Co-Cr Alloys and Devices Using Same" used as the core of an inductive thermometer because of paramagnetic properties with Fe 15-55% by weight, Co 45-65% by weight, and Cr or V of 10-20% by weight for sensing a temperature dependent change in magnetization of the mass. No statement relative to magnetostriction is made. It is seen however, that the weight percentage of 65% at the top for Co for Fe 23%, Cr 12%, Co 65% converts to Fe 23.6 at. %, Cr 13.2 at. % and Co 62.3 at. % which fails to overlap the bottom of 64 at. % for Co for the present invention. In their Example III, the alloy was 12 weight % Cr, 52 weight %, Co and 36 weight % Fe which converts to Cr at. % 13.1, Co at. % 50.3 and Fe at 36.7.

An article by Klokholm and Tan entitled "Sputtering FeCoCr Thin Film Magnetic Media", IBM Technical Disclosure Bulletin 21, No. 10 4241 (March 1979) calls for a high Cr content for corrosion resistance and later quantifies the Cr content as up to 10 at. %.

Much work has been done in the ranges of high concentrations of Fe, above 50 at. % and low concentrations of Cr about 1 at. % or less.

None of the prior art suggests the use of the particular range of alloys of this invention for a low magnetostriction alloy for use as a magnetic recording medium. The only teaching of a close range of alloys is the Nesbitt et al reference which teaches a different range. Also, mention was made of an alloy in the general range of this disclosure in Michaelson et al Ser. No. 956, 296 with Fe 19 at. %, Co 67 at. % and Cr 14 at. % but it was sketchy and mentioned nothing about magnetostriction. In fact, the data is not within the range of acceptable alloys of that patent application (since this Co is above 50 at. % and the iron is less than 23 at. %). Thus, the teachings of the docket would seem to lead away from the teachings of this invention.

DESCRIPTION OF THE PREFERRED EMBODIMENT

When mechanical forces are applied to films used in magnetic recording, the resultant stress anisotropy energy alters the magnetized state producing reversible or irreversible changes. The recorded output after applying pressure shows usually as a signal decrease. The pressure induced losses will be roughly proportional to the magnetostriction constant of the films.

In magnetic disk recording, a magnetic material currently used commercially is a film of FeCoCr, 50:50 Fe:Co with 10–15 at. % Cr. The magnetostriction of FeCoCr films is very high in the fifties ppm. The variation of the magnetostriction is shown in the upper curve of FIG. 1 as a function of Cr content for Fe:Co 48:52. This compares to $\pm 1 \times 10^{-6}$ in plated permalloy used in heads. It is quite important to reduce the magnetostriction of FCC films to a few ppm.

TABLE I $(Fe_{48}Co_{52})_{1-x}Cr_x$

| X (Cr at %) | Saturation Magnetostriction ($\times 10^6$) | Magnetization $4\pi M$ Kilogauss |
|---|---|---|
| 0 | 70 | — |
| 3.8 | — | 18 |
| 7.7 | 68 | 16.6 |
| 11.5 | 56 | 15.9 |
| 15.4 | 39 | 14.4 |
| 19.2 | −2 | 1.0 |
| 23 | — | 0 |

The addition of the Si or Ti to FCC reduces the magnetostriction by a factor of 2.

We have also found that the magnetostriction of CoCr films increases at a slower rate than that of Fe Cr or NiCr films increases.

Figure 1:
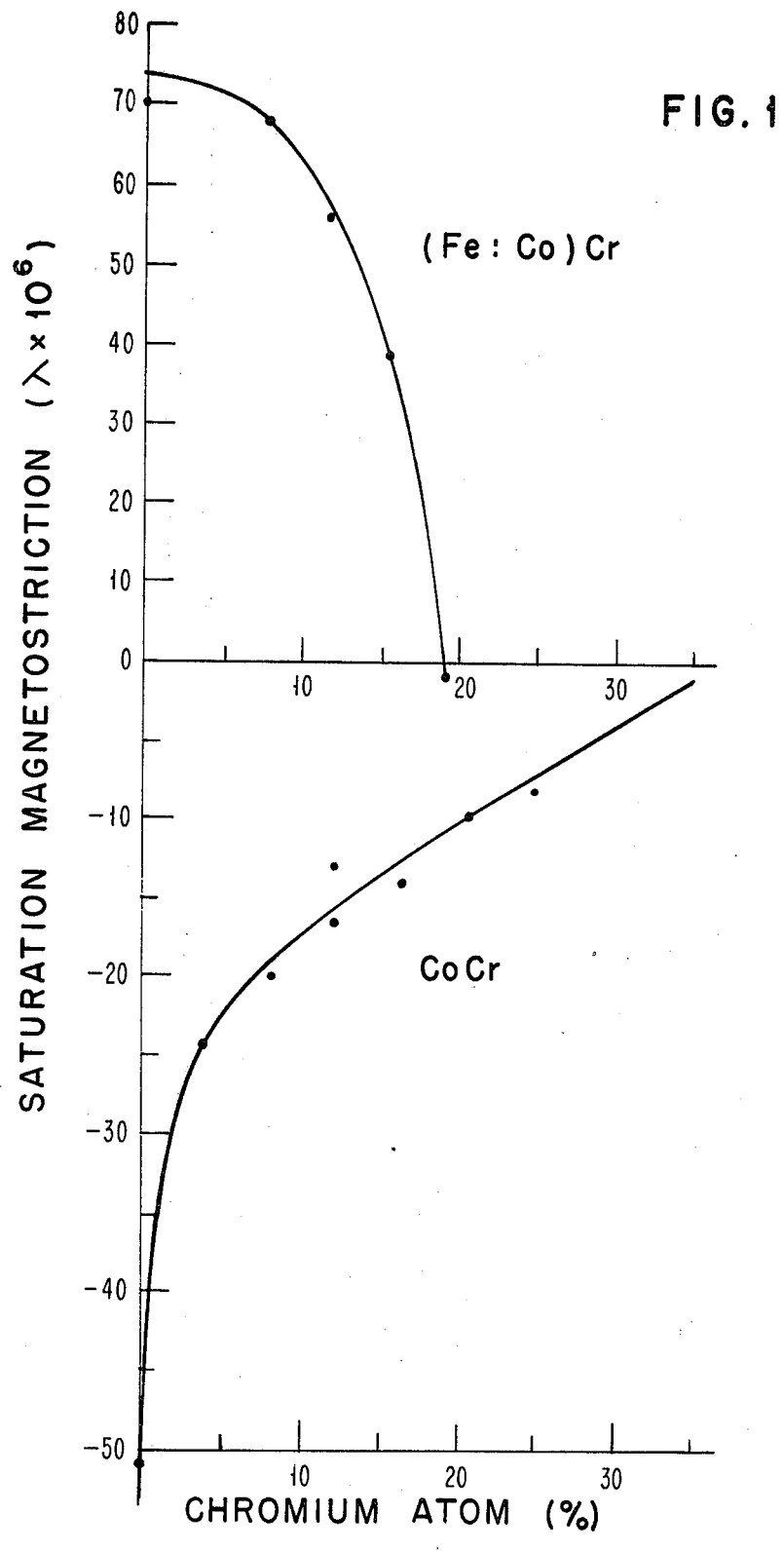
FIG. 1 shows the magnetostriction curves of $(Fe_{48}Co_{52})_{1-x}Cr_x$, and $Co_{1-x}Cr_x$ versus the chromium content of the two alloys.
Figure 2:
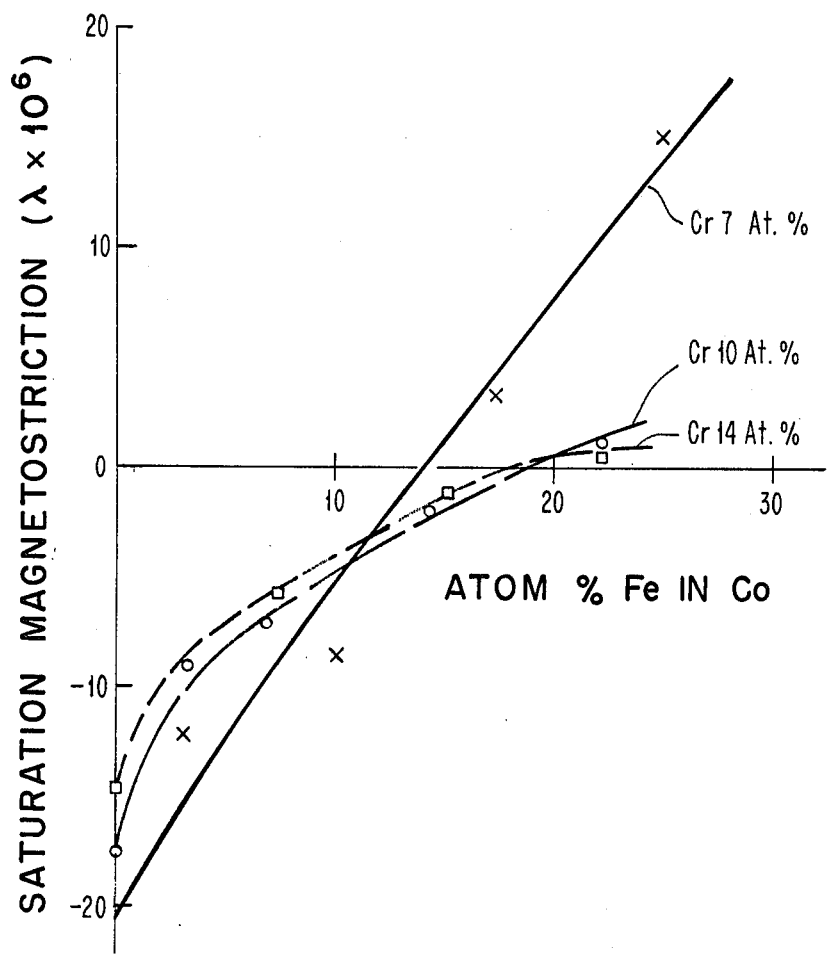
FIG. 2 is a curve of magnetostriction as a function of chromium content for the alloy $(Fe_yCo_{1-y})_{1-x}Cr_x$ for three fixed values of Cr.

We have found that the addition of Fe to CoCr, with different percentages of Cr results in films with magnetostriction varying from negative to positive as shown in FIG. 2. The following example illustrates the variation in the values of magnetostriction. See the lower curve of FIG. 1.

TABLE II $Co_{1-x}Cr_x$

| X (Cr at. %) | Saturation Magnetostriction ($\times 10^6$) |
|---|---|
| 0 | −51 |
| 3.6 | −24.5 |
| 8 | −20 |
| 12.1 | −13 |
| 12.1 | −16.5 |
| 16.2 | −14 |
| 20.5 | −9.7 |
| 25 | −8 |
| $Co_{84}Co_{16}$ | $\lambda = -14 \times 10^{-6}$ |
| Replacing Co by ≃9 at. % Fe | $\lambda = -6 \times 10^{-6}$ |
| 18 at. % Fe | $\lambda = -1.2 \times 10^{-6}$ |
| 27 at. % Fe | $\lambda = -0.7 \times 10^{-6}$ |
| $Co_{92}Cr_8$ | $\lambda = -32 \times 10^{-6}$ |
| with 27% Fe | $\lambda = -11 \times 10^{-6}$ |

Thus for CoCr, with Cr between 12 and 16 at. %, the replacement of Co by 10 to 30 at. % Fe results in films with very small magnetostriction. The material is adapted for use at room temperature below the Curie temperature of the specific alloy employed. When y (Fe) is 13 at. % and x (Cr) is 7 at. % the magnetostriction remains at zero, but the material is not corrosion resistant and thus it is useful for magnetic recording applications only where corrosion is not a problem. Thus, the percentage of Cr must be within the range from 7–17 at. %. Above about 17 at. % of Cr, the saturation magnetization of the films falls off rather precipitiously and it reaches zero at about 20 at. percent of Cr.

This has been shown for $Fe_{48}Co_{52}$ in combination with percentages of Cr added to that FeCo mixture. These alloys are useful for magnetic recording media because of their low magnetostriction which increases the capacity to have assurance as to the location of a bit of information on a medium.

Fe-Co-Cr alloy films described above were deposited by r.f. sputtering using a system previously described, Aboaf, Klokholm and Kobliska, in IEEE Trans. on Magnetics, MAG-14, 5 941 (1978).

Film Sputtering

In particular, the water cooled 15 cm diameter cathode target is made of a copper plate on which a 70 micron thick pure plate of cobalt has been mounted. Triangular shaped segments made of chromium and Fe 0.5 mm thick are positioned on the cobalt plate, with their base held by springs on the outer circumference of the plate and their apex under a cobalt screw mounted in the center of the plate. The anode is water cooled and can be rotated. The anode can also be heated. Metal alloy films were sputtered on 2.5 cm diameter thermally oxidized silicon wafers. The chamber is typically evacuated to $1 \times 10^{-6}$ torr. High purity argon is introduced in the system and the pressure controlled at 20 millitorr. With a shutter covering the substrate holder, the segmented target is pre-sputtered for an hour to clean its surface and help getter the system of background impurities. The substrates are then exposed to the incident flux. Both pre-sputtering and sputtering are done for the same predetermined conditions: 1000 volt cathode bias and −50 volt anode bias. The rotating substrate holder (60 r.p.m.) assures the circumferential composition uniformity of the deposited film.

The thickness of the films was measured in the center of the wafer using a mechanical surface profile meter. The accuracy is limited by the thickness uniformity of the sample which can be in one case as large as 20% from one edge of the sample to the other. The chemical composition of alloy films, typically 3000 Å thick, was measured by electron microprobe. The magnetic properties were measured using an inductive loop tracer which displayed the B vs. H curve directly on an oscilloscope. The saturation magnetization at room temperature was measured at high fields from the B-H loop. The instrument was calibrated by measuring the saturation magnetization of several samples using a force balance magnetometer. The coercivity $H_c$ was obtained from the easy axis hysteresis loop; the saturation anisotropy field $H_k$, by extrapolating the hard axis loop at small drive fields to the saturation magnetization value. The resistivity measurements were made at room temperature using a four point probe. Magnetostriction measurements were made at room temperature using the apparatus developed by E. Kolkholm, IEEE Trans. MAG-12 6 (1976).

Results and Discussion

Sputtering of Alloys:

The results reported here are for sputter depositions made in 20 microns argon pressure at a −50 volt anode bias and 1000 volts cathode potential. The composition of the films was obtained by varying the area coverage of the Co target plate by Fe and Cr and analysis of the films was made by electron microprobe analysis. Once the system is calibrated, various compositions can be obtained reproducibly. The uniformity of the chemical composition of the deposited films is constant within the precision of the electron microprobe analysis (accuracy±2% for cobalt and titanium). The deposition rate of the films is about 50 angstroms per minute.

We have found that the desirable ranges of the alloys to be used are illustrated by the data in Tables III, IV and V for values of Cr of 7–17 atomic percent as shown in FIG. 2 which all provide zero magnetostriction plus other desirable magnetic characteristics. If the values of Cr are kept above 7 atomic percent of Cr corrosion can be avoided. For at least 8 at. % of Cr, the rate of corrosion is acceptable. It appears that the largest amount of Cr which can be added to the alloy is about 20 at. %. Otherwise, the alloy has a reduced magnetization which is zero above 20 at. % Cr.

The preferred corrosion free compositions of the alloy are as follows:
Fe:12.5 to 21 atomic percent
Co:64 to 78 atomic percent
Cr: 8 to 17 atomic percent
The material is adapted to use at room temperature below the Curie point of the specific alloy. Above about 17 atomic percent of Cr in the film, the saturation magnetization of the films falls off rather precipitously and it reaches zero at about 18 atomic percent of Cr. This is shown in connection with data collected in connection with the $Fe_{48}Co_{52}$ alloys as illustrated in FIG. 1 in the upper curve for 18 atomic percent of Cr.

TABLE III $(Co_xFe_y)_{93}Cr_7$

| Y (Fe at. %) | Saturation Magnetostriction $\lambda$ (× $10^6$) | $4\pi M$ Kilogauss |
|---|---|---|
| 3 ($Co_{97}Fe_3$) | −21 | 12.3 |
| 10 ($Co_{90}Fe_{10}$) | −8.5 | 12.1 |
| 17 ($Co_{83}Fe_{17}$) | +3.2 | 13.1 |
| 25 ($Co_{25}Fe_{25}$) | −15 | 15 |

TABLE IV $(Co_xFe_y)_{90}Cr_{10}$

| y (Fe at. %) | Saturation Magnetostriction $\lambda$ (× $10^6$) | Magnetization $4\pi M$ Kilogauss |
|---|---|---|
| 3 ($Co_{97}Fe_3$) | −8.9 | |
| 7 ($Co_{93}Fe_7$) | −7 | 9.8 |
| 14 ($Co_{86}Fe_{14}$) | −2 | 9.8 |
| 22 ($Co_{78}Fe_{22}$) | +1 | 8.5 |

TABLE V $(Co_xFe_y)_{86}Cr_{14}$

| Y (Fe at. %) | Saturation Magnetostriction $\lambda$ (× $10^6$) | Magnetization $4\pi M$ Kilogauss |
|---|---|---|
| 7 ($Co_{93}Fe_{97}$) | −6 | 7.4 |
| 15 ($Co_{85}Fe_{15}$) | −1.3 | 6.7 |
| 23 ($Co_{77}Fe_{23}$) | +0.7 | 6.0 |

Figure 3:
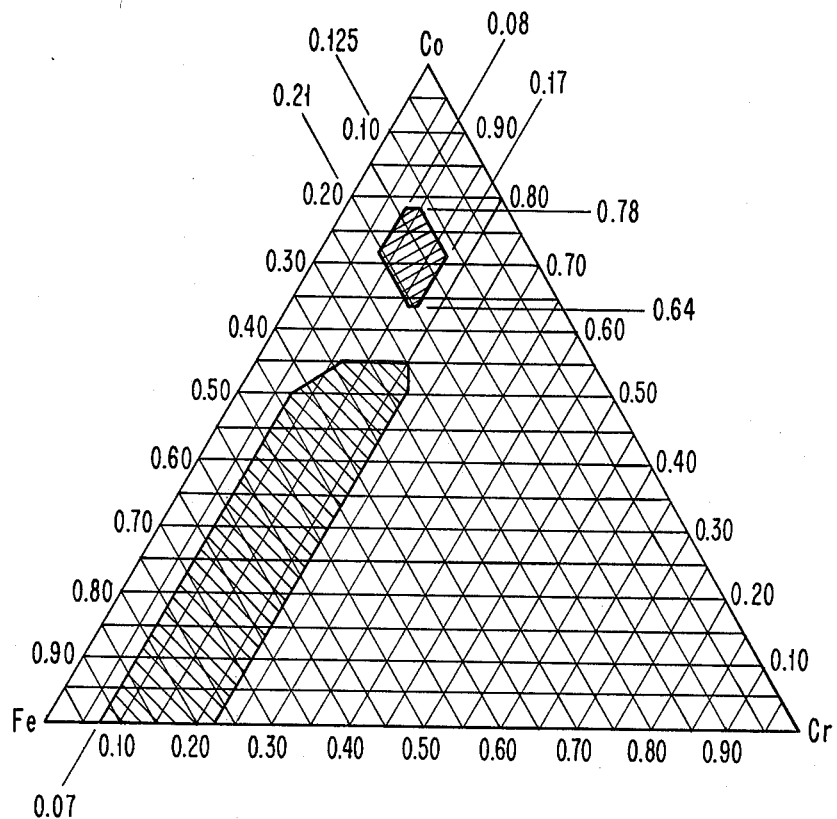
FIGS. 3 and 4 show ternary composition diagrams for FeCoCr alloys.

FIG. 3 shows the ternary composition diagram for FeCoCr in atomic fractions with the upper cross hatch area showing the composition of alloys in accordance with this invention. The lower cross-hatched area shows the composition of alloys in accordance with Ser. No. 956,296. The higher compositions of Co are obvious and the two areas are clearly separated. The area is very small.

Figure 4:
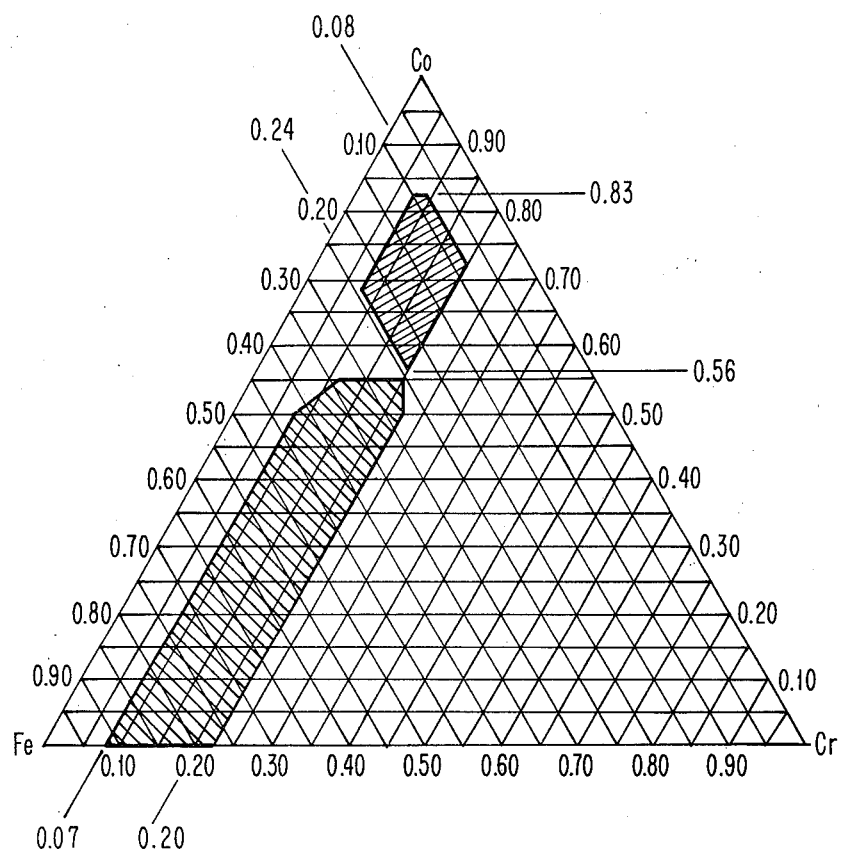

FIG. 4 shows the broader area of alloy composition which provides satisfactory results in accordance with the maximum ranges of this invention. The maximum ranges of the composition of the alloy are about as follows:
Fe—8—24 atomic percent
Co—56—83 atomic percent
Cr—7—20 atomic percent
FIG. 3 provides higher $4\pi M$ and excellent corrosion resistance, for values of Cr of 8–17 at. % Cr; 12.5 to 21 at. % Fe and between 64 and 78 at. % Co.

Having thus described our invention, what we claim as new and desire to secure by Letters Patent is:

1. A thin film magnetic recording medium for storing magnetic transistions representative of data information, said medium comprising a thin film layer consisting essentially of Fe, Co, and Cr, said film having substantially zero magnetostriction in accordance with the formula (FeCo) Cr with atomic percentage ranges of about

| element | atomic percent |
|---|---|
| Fe | 8–24 |
| Co | 56–83 |
| Cr | 7–20 | whereby magnetic recordings can be made without altering the magnetic state of the medium in response to extraneous mechanical forces.

2. A medium in accordance with claim 1 wherein said alloy comprises $(Co_xFe_y)_{93}Cr_7$ with about 7 atomic percent Cr and about 93 atomic percent of $(Co_xFe_y)$ where x is about 85 atomic percent for an overall percentage of about

| element | atomic percent |
|---|---|
| Co | 79 |
| Fe | 14 |
| Cr | 7 |

3. A medium in accordance with claim 1 wherein said alloy comprises $(Co_xFe_y)_{90}Cr_{10}$ with about 10 atomic percent Cr and about 90 atomic percent of $(Co_xFe_y)$ where x is about 78 atomic percent of Co and y is about 22 atomic percent of Fe, for an overall percentage of about

| element | atomic percent |
|---|---|
| Co | 70 |
| Fe | 20 |
| Cr | 10 |

4. A medium in accordance with claim 1 wherein said alloy comprises $(Co_xFe_y)_{86}Cr_{14}$ with about 14 atomic percent Cr and about 77 atomic percent of Co and y is about 23 atomic percent of Fe, for an overall percentage of about

| element | atomic percent |
|---|---|
| Co | 66 |
| Fe | 20 |
| Cr | 14 |

5. A medium in accordance with claim 1 having between about 8 and 17 atomic percent Cr, between about 12.5 and 21 atomic percent Fe, and with the remainder between 64 and 78 atomic percent Co.

* * * * *